Patented Aug. 22, 1950

2,519,881

UNITED STATES PATENT OFFICE 2,519,881

POLYSILOXANES

Stuart Dexter Brewer, Ballston Lake, N. Y., assignor to General Electric Company, a corporation of New York No Drawing. Application September 13, 1947, Serial No. 773,919

6 Claims. (Cl. 260—448.2)

This invention relates to novel chemical compounds and more particularly relates to linear hydrocarbon-substituted polysiloxane derivatives corresponding to the general formula I
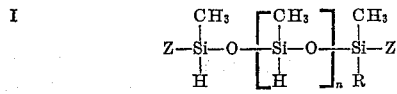

where Z is the same and is a member of the class consisting of halogens and lower alkyl radicals, R is a member of the class consisting of hydrogen and lower alkyl radicals, and $n$ is one of the following: 0, 1.

Illustrative examples of lower alkyl radicals that Z and R in the above formula may represent are methyl, ethyl, propyl, isopropyl, butyl, etc. R and Z preferably contain from 1 to 2 carbon atoms. Among the examples of halogens which may be represented by Z are chlorine, bromine, fluorine, etc. Where Z is a halogen it is preferably chlorine.

It will be apparent from the above formula that where $n$ is zero, the formula will then have the following structure:

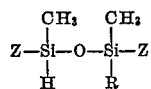

where Z and R have the meanings given above in connection with Formula I.

The new compounds of this invention may be used as intermediates in the preparation of derivatives thereof. They are especially valuable in the preparation of synthetic condensation products, for example, in the preparation of linear oily compositions of matter useful for lubricating purposes. They may also be condensed with unsaturated hydrocarbons in accordance with the disclosures and teachings found in Krieble applications Serial Nos. 740,261–263, filed April 8, 1947, all of which applications are assigned to the same assignee as the present invention, the latter two of which are now Patent Nos. 2,510,642 and 2,479,374, respectively.

The halogen-terminated polysiloxanes embraced by the above Formula I may be made to react with those reagents which are generally known to react with silicon-bonded halogen, e. g., water, ammonia, Grignard reagents, etc.

Various methods may be employed to produce the chemical compounds of this invention. Where it is desired to prepare compounds of my invention containing no halogen, reaction may be effected, in an ether medium, between the oily hydrolysis product of methyldichlorosilane ($CH_3SiHCl_2$) and a lower alkyl Grignard reagent wherein the alkyl group of the Grignard reagent is a member of the same class as specified for Z in Formula I. Thereafter, the mixture is preferably treated with ice and dilute aqueous sulphuric acid. The ether solution which separates is washed with water, dried over a drying agent, for example, calcium chloride, and finally fractionally distilled to yield the desired products.

Where it is desired to produce halogen-terminated polysiloxanes corresponding to the above formula, reaction is effected between the oily hydrolysis product of methyldichlorosilane and a lower alkyl-substituted dichlorosilane, for instance, methyldichlorosilane, in the presence of a small amount of a catalyst, for example, ferric chloride hexahydrate. The reaction is preferably conducted in a closed vessel provided with means for suitable agitation. Fractional distillation of the reaction product yields the desired halogen-substituted polysiloxane. The method of preparation of the various compounds embraced by Formula I will become more apparent from the following examples which are given by way of illustration.

Example 1

About 730 grams of the isolated oily hydrolysis product obtained by hydrolyzing methyldichlorosilane was thoroughly mixed with 1300 grams (11.3 mols) methyldichlorosilane and 10 grams ferric chloride hexahydrate. The reaction vessel in which the mixture was confined was sealed tightly for 2 hours and shaken periodically. At the end of this time the reaction mass was fractionally distilled to yield 535 grams (3.06 mols) of 1,3-dichloro-1,3-dimethyldisiloxane having the formula

This compound has a boiling point of 104.0° C. at atmospheric pressure (about 754 mm.) and a density $$d_{27}^{27} 1.076$$

Analysis of the compound showed it to contain 40.49 per cent chlorine (calculated 40.48 per cent).

Continuing the fractional distillation described above, there was obtained 25 grams (0.11 mol) of 1,5 - dichloro-1,3,5-trimethyl-trisiloxane having the formula

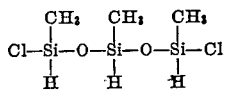

This compound has the following properties:
B. P.=146.0–146.5° C. and $$d_{27}^{27} \, 1.059$$

Analysis of the compound showed it to contain 30.60 per cent chlorine (calculated 30.15 per cent).

*Example 2*

A solution of methyl magnesium bromide and ethyl ether was prepared by adding a solution of 1325 grams (13.9 mols) of methyl bromide in 630 grams diethyl ether to 334 grams (13.8 mols) of magnesium metal. To this solution was added 711 grams (11.8 mols) of a liquid, oily polymeric methylsiloxane obtained by hydrolyzing methyldichlorosilane. The reaction mixture was allowed to stand for about 24 hours and was then mixed with ice and sufficient dilute aqueous sulphuric acid to solubilize all the magnesium compounds present. The ether solution which separated was washed with water to remove residual acid and was dried over calcium chloride. The ether was removed by distillation and the residue was treated with concentrated sulfuric acid to complete the dehydration of silanols. The sulfuric acid was removed, the residue washed, and the residue fractionally distilled to yield the following compositions of matter having the designated properties:

| Polysiloxane | B. P. | $n_D^{20}$ | $D_4^{20}$ | $R_D^{20}$ | | Per cent Hydrogen Bonded to Silicon | |
|---|---|---|---|---|---|---|---|
| | | | | Found | Calc. | Found | Calc. |
| 1,1,3,3-Tetramethyldisiloxane | °C. 71.8 | 1.3694 | 0.7564 | 0.2986 | 0.2993 | 1.51 | 1.50 |
| pentamethyldisiloxane | 86.0 | 1.3739 | 0.7599 | 0.3005 | 0.3005 | 0.68 | 0.68 |
| hexamethyltrisiloxane [1] | 130–132 | 1.3802 | 0.8203 | 0.2824 | 0.2824 | 0.98 | 0.97 |

[1] 1,1,3,5,5-hexamethyltrisiloxane.

*Example 3*

An ether solution of ethyl magnesium bromide was prepared in the usual Grignard fashion from 46 grams (2 mols) magnesium metal and 218 grams (2 mols) ethyl bromide. To this solution was added an ether solution of the dried, liquid, oily hydrolysis product of methyl dichlorosilane. The mixture was treated with aqueous sulphuric acid and ice, and the ether solution, which separated from the water phase, was washed thoroughly and dried. Fractional distillation of the residue yielded the following compounds:

*Example 4*

To a mixture of 13.5 grams (0.12 mol) 1,1,3,3-tetramethyldisiloxane and 22 grams (0.11 mol) 1,3-diethyl - 1,1,3,3 - tetramethyldisiloxane was added 1 cc. of 95 per cent sulphuric acid. The mixture was shaken periodically for ½ hour and thereafter washed with water and the resulting oil dried over potassium carbonate. Fractional distillation yielded the compound 1-ethyl-1,1,3,3-tetramethyldisiloxane (also identified as 1,1,3,3-tetramethyl-3-ethyldisiloxane) having the following properties:

B. P. 112.7° C.
$n_D^{20}$, 1.3879
$d_4^{20}$, 0.78086
$R_D^{20}$, 0.3021 (calc. 0.3025)

*Example 5*

In this example 1,3-dichloro-1,3,3-trimethyldisiloxane having the formula $$\begin{array}{ccc} CH_3 & & CH_3 \\ | & & | \\ Cl-Si-O-Si-Cl \\ | & & | \\ H & & CH_3 \end{array}$$

was prepared as follows: A mixture consisting of 460 grams (4 mols) of methyldichlorosilane and 22 grams octamethylcyclotetrasiloxane together with 2 grams ferric chloride hexahydrate was placed in a reaction vessel which was tightly stopped and sealed. This mixture was allowed to stand for 90 minutes at 20° C. Thereafter it was fractionally distilled to yield a fraction boiling at 122° C. which was identified at 1,3-dichloro-1,3,3-trimethyldisiloxane. This compound was found by analysis to contain 37.60 per cent chlorine (calculated 37.49 per cent). The compound had a

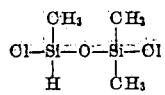

From the foregoing examples it will be apparent to those skilled in the art that other chemical compounds embraced by the general formula disclosed in the first paragraph of this application may be prepared by the procedures employed in the preparation of the previously described and isolated chemical compounds. Among such compounds may be mentioned 1,3-dimethyl-1,3-dipropyldisiloxane, 1,3,3,5-trimethyl-1,5-dipropyl-trisiloxane, pentabutyldisiloxane, 1,3-dibromo-1,3-dipropyldisiloxane, 1,5-dichloro-1,3,3,5-tetramethyltrisiloxane, 1,5-dibromo-1,3,3,5,5 - pentamethyltrisiloxane, etc.

| Polysiloxane | B. P. | $n_D^{30}$ | $D_4^{30}$ | $R_D^{30}$ | | Per cent Hydrogen Bonded to Silicon | |
|---|---|---|---|---|---|---|---|
| | | | | Found | Calc. | Found | Calc. |
| 1,3-diethyl-1,3-dimethyldisiloxane | °C. 126.6 | 1.3972 | 0.7946 | 0.3032 | 0.3037 | 1.26 | 1.23 |
| 1,5-diethyl-1,3,5-trimethyltrisiloxane | 163.4–164.4 | 1.4007 | 0.8376 | 0.2899 | 0.2859 | 1.28 | 1.35 |

What I claim as new and desire to secure by Letters Patent of the United States is:

1. Chemical compounds corresponding to the general formula

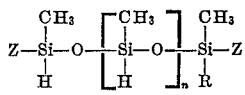

where Z is the same and is a lower alkyl radical, R is a member of the class consisting of hydrogen and lower alkyl radicals, and $n$ is one of the following: 0,1.

2. 1,1,3,3,3-pentamethyldisiloxane.
3. 1,1,3,3-tetramethyl-3-ethyldisiloxane.
4. 1,1,3,5,5-hexamethyltrisiloxane.

5. The method which comprises (1) effecting reaction between the oily hydrolysis product of methyldichlorosilane and a lower alkyl Grignard reagent wherein the alkyl group contains from one to two carbon atoms, and (2) fractionally distilling the reaction product to yield compounds corresponding to the general formula

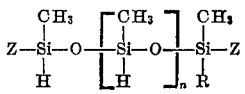

where Z is the same and is a lower alkyl radical containing from one to two carbon atoms, R is a member of the class consisting of hydrogen and lower alkyl radicals, and $n$ is one of the following: 0,1.

6. The process which comprises (1) effecting reaction between the oily hydrolysis product of methyldichlorosilane and methyl magnesium bromide in an ethyl ether medium and (2) fractionally distilling the reaction product to obtain pentamethyldisiloxane.

STUART DEXTER BREWER.

REFERENCES CITED

The following references are of record in the file of this patent:

UNITED STATES PATENTS

| Number | Name | Date |
|---|---|---|
| 2,381,366 | Patnode | Aug. 7, 1945 |
| 2,386,441 | Daudt | Oct. 9, 1945 |
| 2,421,653 | Sauer | June 3, 1947 |

OTHER REFERENCES

Patnode et al.: "Jour. Amer. Chem. Soc.," vol. 68 (1946), pages 358–363.

Rochow: "Chemistry of the Silicones," page 37, published in 1946 by John Wiley & Sons.